United States Patent
Berger et al.

(10) Patent No.: US 12,062,203 B2
(45) Date of Patent: Aug. 13, 2024

(54) SHOT-PROCESSING DEVICE

(71) Applicants: INSTITUT NATIONAL DE RECHERCHE EN INFORMATIQUE ET EN AUTOMATIQUE, LeChesnay (FR); Universite De Lorraine, Nancy (FR)

(72) Inventors: Marie-Odile Berger, LeChesnay (FR); Vincent Gaudilliere, LeChesnay (FR); Gilles Simon, LeChesnay (FR)

(73) Assignees: Institut National De Recherche En Informatique Et En Automatique, Lechesnay (FR); Universite De Lorraine, Nancy (FR)

( * ) Notice: Subject to any disclaimer, the term of this patent is extended or adjusted under 35 U.S.C. 154(b) by 388 days.

(21) Appl. No.: 17/614,111

(22) PCT Filed: May 22, 2020

(86) PCT No.: PCT/FR2020/050858
§ 371 (c)(1),
(2) Date: Nov. 24, 2021

(87) PCT Pub. No.: WO2020/240124
PCT Pub. Date: Dec. 3, 2020

(65) Prior Publication Data
US 2022/0319035 A1 Oct. 6, 2022

(30) Foreign Application Priority Data
May 24, 2019 (FR) ...................................... 1905535

(51) Int. Cl.
*G06T 7/70* (2017.01)
*G06T 7/60* (2017.01)
(Continued)

(52) U.S. Cl.
CPC .................. *G06T 7/70* (2017.01); *G06T 7/60* (2013.01); *G06V 10/225* (2022.01);
(Continued)

(58) Field of Classification Search
CPC ... G06T 7/70; G06T 7/60; G06T 2207/20068; G06T 2207/30244; G06T 7/75; G06V 10/225; G06V 10/761; G06V 20/647
See application file for complete search history.

(56) References Cited

U.S. PATENT DOCUMENTS 9,002,062 B2 * 4/2015 Aller .......................... G06T 7/73
382/296

FOREIGN PATENT DOCUMENTS

| EP | 3977411 A1 | 12/2020 |
| FR | 3096499 A1 | 11/2020 |
| WO | 2020/240124 A1 | 12/2020 |

OTHER PUBLICATIONS

Nicholson et al., QuadricSLAM: Dual Quadrics From Object Detections as Landmarks in Object-Oriented SLAM, IEEE Robotics and Automation Letters, vol. 4, No. 1, Jan. 2019 (Year: 2019).*
(Continued)

*Primary Examiner* — Vu Le
*Assistant Examiner* — Lei Zhao
(74) *Attorney, Agent, or Firm* — David D. Brush; Westman, Champlin & Koehler, P.A.

(57) ABSTRACT

The invention relates to a shot-processing device. The memory receives scene data comprising three-dimensional object pairs associating an object identifier, the ellipsoid data, which define an ellipsoid and its orientation and a position of center, and shot data defining a two-dimensional image of the scene, from a viewpoint corresponding to a desired pose. The detector receives shot data and returns two-dimensional object pairs comprising an object identifier
(Continued)

and its associated shot region. The preparer determines a set of positioning elements, each associating the object identifier, the ellipsoid data, and ellipse data which define an ellipse approximating the shot region. The combiner generates candidates associating positioning elements and a shot orientation. The estimator calculates a pose comprising a position and an orientation. The selector projects the ellipsoid data onto the shot data from the pose, determines a measurement of similarity and selects the pose that has the highest likelihood value.

8 Claims, 1 Drawing Sheet

(51) Int. Cl.
    *G06V 10/22*          (2022.01)
    *G06V 10/74*          (2022.01)
    *G06V 20/64*          (2022.01)

(52) U.S. Cl.
    CPC .......... *G06V 10/761* (2022.01); *G06V 20/647* (2022.01); *G06T 2207/20068* (2013.01)

(56) References Cited

OTHER PUBLICATIONS

Rubino et al., 3D Pose from Detections, arXiv:1502.04754v3 [cs.CV] Jul. 20, 2015 (Year: 2015).*

Gay et al., Probabilistic Structure from Motion with Objects (PSfMO), Proceedings of the IEEE International Conference on Computer Vision (ICCV), 2017, pp. 3075-3084 (Year: 2017).*

Hosseinzadeh et al., Structure Aware SLAM using Quadrics and Planes, arXiv:1804.09111v3 [cs.RO] Nov. 2, 2018 (Year: 2018).*

Nicholson, et al., "QuadricSLAM: Dual Quadrics From Object Detections as Landmarks in Object-Oriented SLAM," IEEE Robotics and Automation Letters, Jan. 2019, pp. 1-8, vol. 4, No. 1.

Gay, et al., "Probabilistic Structure from Motion with Objects (PSfMO)," IEEE International Conference on Computer Vision, Oct. 2017, pp. 3094-3103.

Mehdi, et al., "Structure Aware SLAM using Quadrics and Planes," ARXIV.Org, Cornell University Library, Apr. 2018, 8 pages.

International Search Report and Written Opinion received for International Patent Application No. PCT/FR2020/050858, mailed on Sep. 18, 2020, 20 pages including English translation.

International preliminary report on patentability received for International Patent Application No. PCT/FR2020/050858, mailed on Dec. 2, 2021, 15 pages including English translation.

Redmon et al., "You only look once: Unified, real-time object detection", in CVPR, 2016, 779-788 pages.

Simon et al., "A-Contrario Horizon-First Vanishing Point Detection Using Second-Order Grouping Laws". In ECCV, 2018, 1-16 pages.

Simon et al., "A Simple and Effective Method to Detect Orthogonal Vanishing Points in Uncalibrated Images of Man-Made Environments," In Eurographics, 2016, 33-36 pages.

Zhai et al., "Detecting vanishing points using global image context in a non-Manhattan world". In CVPR, 2016, 5657-5665 pages.

* cited by examiner

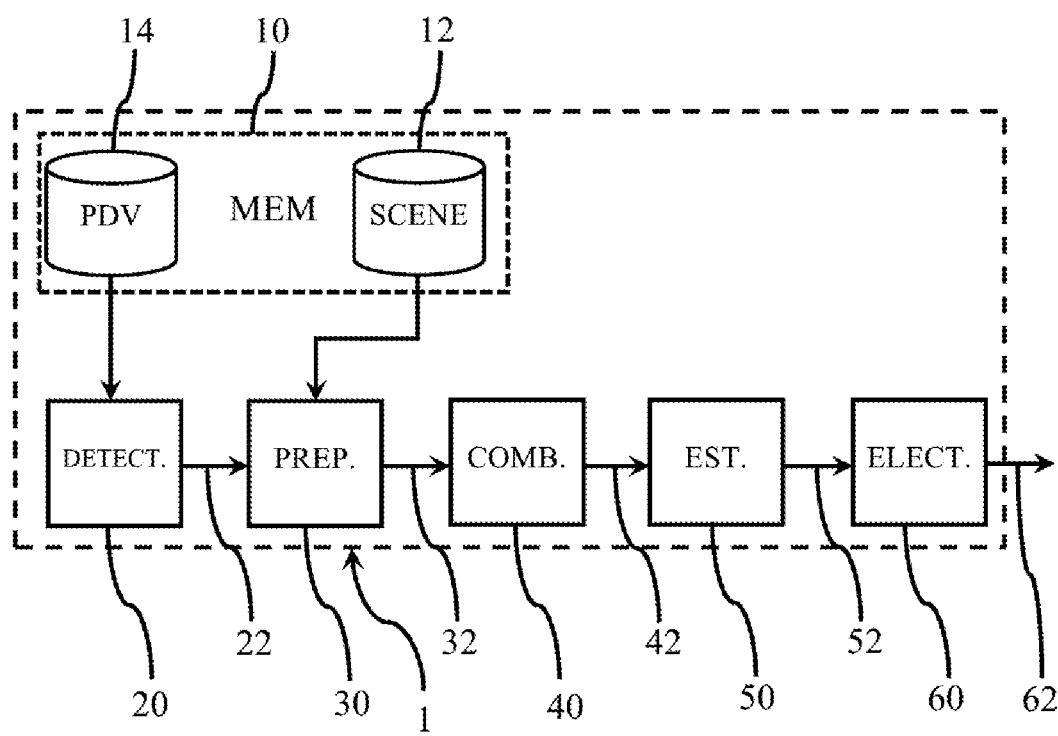

SHOT-PROCESSING DEVICE

The present invention relates to the field of localisation, and in particular to the determination, within a known scene, of a position and an orientation, forming a pair referred to as a pose.

Visual positioning is a complex field. Positioning allows a moving individual or vehicle to be localised on a (2D or 3D) "map" of the environment in which it is moving. For example, GPS allows a GPS receiver to be localised in a terrestrial frame of reference (latitude, longitude, altitude). This field differs from the field of odometry.

Odometry (from the Greek hodos meaning journey or travel, and metron meaning measure) is used to estimate the position and orientation of a moving vehicle, relative to its original position and orientation. This is typically achieved by measuring the successive displacements of a vehicle's wheels, or by integrating acceleration data provided by an inertial unit. Odometry generally suffers from a drift problem.

Visual positioning uses computer vision and analyses the images from a video or stills camera to deduce the position and orientation of this sensor on a pre-defined map of the environment. The map can take different forms: it can be a 3D point cloud, where the pose calculation is based on a 3D-2D matching between points in the cloud and points detected in the images. It can also be a tag of known geometry that is easily detected in the images, or several tags whose relative positions and orientations are known. Tag detection allows the position in the image of 3D points associated with the tags to be determined (for example the corners of the tags) and the pose is, again, calculated using 3D-2D point matching.

Visual odometry uses images acquired by a camera to supplement or replace conventional odometry data. This method is used to obtain the camera's movements between consecutive images. A 3D point cloud is usually reconstructed on the fly from 2D points matched between consecutive images. The calculation of the movement and the reconstruction of the points thus take place simultaneously. This is known as visual SLAM (Simultaneous Localisation And Mapping).

Visual positioning thus allows the video (or stills) camera to be positioned relative to a predefined map. If virtual objects have been placed on this map, the visual positioning allows them to be viewed on top of the real images, according to the perspective of these images, thus achieving an augmented reality effect. It also provides real-time localisation information for obstacle avoidance and navigation assistance.

Visual odometry does not take into account a predefined map. A map is optionally reconstructed on the fly, which allows for obstacle avoidance, but this map is initially blank of any external information that could be useful, for example, for augmented reality or navigation assistance. Information can be added to the map during construction, but the system is not able to take into account information defined before this map is used. On the other hand, if the map under construction is matched with a predefined map (3D-3D matching), or if the pose obtained at the beginning of the process is in some way expressed in a predefined frame of reference, information associated with this frame of reference can be exploited.

Visual positioning is typically based on a set of 2D-3D matches between points detected in the images and a 3D point cloud, previously reconstructed using an SFM (Structure From Motion) technique. Depending on the context, these matches are made using (i) local descriptors associated with each point, (ii) learning techniques that directly infer, in the images, via convolutional neural networks (CNN), the projection of previously identified control points onto 3D models of objects present in the scene (iii) the detection of tags positioned in the environment.

In the first case (i), the points are described by vectors of dimension K (typically, K=128) called descriptors (most commonly used example: the SIFT descriptor), which is known for the points in the 3D cloud and calculated in real time for the points detected. This method is limited in scope because, on the one hand, the point descriptors are not robust to changes in illumination and major changes in viewpoints and, on the other hand, they take into account the local appearance of the points, which is weakly discriminating in general. These problems often cause the method to fail, in particular in large environments and/or in the presence of repeated patterns.

In the second case (ii), keypoint detection is robust to major changes in viewpoint and illumination, provided that these variations are represented in the images used to train the CNN. The drawback of this method is that a large number of images associated with known camera positions and orientations must be used to train the CNN for each considered object in the scene. This method is thus difficult to adapt to a new environment.

In the last case (iii), tag detection is robust to changes in lighting and viewpoint. Furthermore, since each tag can be identified by easily recognisable visual cues, this method is not affected by the problems regarding repeating patterns. The drawback is that tags must be positioned in the environment, so that at least one thereof is always visible during the phase in which the system is in use, and so that the relative positions and orientations of these tags are known. This method is thus relatively tedious to implement, and the presence of tags in the environment is not always ideal.

The invention improves this situation. To this end, the invention provides a shot-processing device, comprising:
  a memory arranged to receive, on the one hand, scene data that comprise three-dimensional object pairs each associating an object identifier, and ellipsoid data which define an ellipsoid and its orientation and a position of its centre in a common frame of reference and, on the other hand, shot data defining a two-dimensional image of the scene associated with the scene data, from a viewpoint corresponding to a desired pose,
  a detector arranged to receive shot data and to return one or more two-dimensional object pairs each comprising an object identifier present in the scene data, and a shot region associated with this object identifier,
  a preparer arranged to determine, for at least some of the two-dimensional object pairs from the detector, a set of positioning elements, the number whereof is less than or equal to the number of three-dimensional object pairs in the scene data that comprise the object identifier of the two-dimensional object pair in question, each positioning element associating the object identifier and the ellipsoid data of a three-dimensional object pair comprising this object identifier, and ellipse data which define an ellipse approximating the shot region of the two-dimensional object pair in question and its orientation as well as a position of its centre in the two-dimensional image,
  a combiner arranged to generate a list of candidates each associating one or more positioning elements and a shot orientation, and/or the combination of at least two positioning elements, the positioning elements of a candidate being taken from separate two-dimensional object pairs and not relating to the same three-dimensional object pair, an estimator arranged to calculate, for at least one of the candidates, a pose comprising a position and an orientation in the common frame of reference from the ellipse data and the ellipsoid data of the positioning elements, or from the ellipse data and the ellipsoid data of the one or more positioning elements and the shot orientation, a selector arranged, for at least some of the poses, to project all of the ellipsoid data of the scene data onto the shot data from the pose, to determine a measurement of similarity between each projection of the ellipsoid data and each ellipse defined by a two-dimensional object pair coming from the detector, and to calculate a likelihood value by using, for each projection of the ellipsoid data, the largest measurement of similarity determined, and to select the pose that has the highest likelihood value.

This device is very advantageous because of its ability to determine a position and an orientation, or a pose, without any additional sensors or external localisation systems such as a satellite localisation system. There are several advantages to having an independent device. Firstly, localisation can be carried out in confined spaces, where it is difficult or even impossible to pick up signals from an external localisation system. Moreover, the localisation device can be implemented with relatively inexpensive equipment.

The invention further relates to a shot-processing method based on:

scene data that comprise three-dimensional object pairs each associating an object identifier, and ellipsoid data which define an ellipsoid and its orientation and a position of its centre in a common frame of reference, and shot data defining a two-dimensional image of the scene associated with the scene data, from a viewpoint corresponding to a desired pose.

The method comprises the following operations:

a) detecting, from shot data, one or more two-dimensional object pairs each comprising an object identifier present in the scene data, and a shot region associated with this object identifier, b) determining, for at least one of the two-dimensional object pairs detected, a set of positioning elements, the number whereof is less than or equal to the number of three-dimensional object pairs in the scene data that comprise the object identifier of the two-dimensional object pair in question, each positioning element associating the object identifier and the ellipsoid data of a three-dimensional object pair comprising this object identifier, and ellipse data which define an ellipse approximating the shot region of the two-dimensional object pair in question and its orientation as well as a position of its centre in the two-dimensional image, c) generating a list of candidates each associating one or more positioning elements and a shot orientation, and/or the combination of at least two positioning elements, the positioning elements of a candidate being taken from two separate two-dimensional object pairs and not relating to the same three-dimensional object pair, d) calculating, for at least one of the candidates, a pose comprising a position and an orientation in the common frame of reference from the ellipse data and the ellipsoid data of the positioning elements, or from the ellipse data and the ellipsoid data of the one or more positioning elements and the shot orientation, e) projecting, for at least some of the poses, all of the ellipsoid data of the scene data onto the shot data from the pose, to determine a measurement of similarity between each projection of the ellipsoid data and each ellipse defined by a two-dimensional object pair detected, and to calculate a likelihood value by using, for each projection of the ellipsoid data, the largest measurement of similarity determined, and f) selecting the pose that has the highest likelihood value.

In various alternatives, the device according to the invention can have one or more of the following features:

the selector is arranged to carry out a measurement of likelihood based, for a given pose, on the number of measurements of similarity that exceed a given threshold, the preparer determines the ellipse data of each positioning element using a method of least squares, the detector determines a rectangular box as a shot region of each two-dimensional pair to be returned, and the preparer determines the ellipse data of each positioning element based on the ellipse inscribed in the rectangular box forming the shot region, the combiner is arranged to determine the shot orientation as a function of the detection of vanishing points within the two-dimensional image of the scene associated with the scene data, the combiner is arranged to determine the shot orientation by means of a sensor, and the device further comprises a shot device arranged to capture a shot of the scene from a given viewpoint in order to derive the shot data therefrom.

Other features and advantages of the invention will be described in detail in the following description, which is given with reference to the accompanying drawing, in which:

FIG. 1 shows a diagrammatic view of the localisation device according to the invention.

The appended drawings essentially contain elements of a definite nature. They can thus serve not only to assist with the understanding of the present invention, but also to contribute to the definition thereof, where appropriate.

Reference is made to FIG. 1.

A localisation device 1 according to the invention comprises a memory 10, a detector 20, a preparer 30, a combiner 40, an estimator 50 and a selector 60.

In the example described here, the pose determination device 1 is implemented on a computer that receives data in the memory 10 to determine a pose within a known scene. The term 'computer' must be interpreted in the broad sense. For example, it can be a tablet or a smartphone, an interaction terminal with a compute server, or an element on a distributed resource grid, etc.

The detector 20, the preparer 30, the combiner 40, the estimator 50, and the selector 60 are, in this case, programs run by the processor of the computer. Alternatively, one or more of these elements could be implemented in a different manner by means of a dedicated processor. The term 'processor' must be understood to mean any processor adapted to the data processing operations described hereafter. Such a processor can be produced in any known manner, in the form of a microprocessor for a personal computer, a dedicated chip of the FPGA or SoC (System on Chip) type, a computing resource on a grid, a microcontroller, or any other form suitable for providing the computing power required to carry out the operations described hereafter. One or more of these elements can also be produced in the form of specialised electronic circuits such as an ASIC. An electronic circuit-processor combination can also be considered.

The memory 10 can be any type of data storage suitable for receiving digital data: hard drive, solid state drive (SSD), flash drive of any form, random access memory, magnetic drive, cloud or local distributed storage, etc. The data computed by the device 1 can be stored in any type of memory similar to the memory 10, or therein. These data can be erased after the device has carried out its tasks, or they can be saved.

The memory 10 receives scene data 12 and shot data 14. In the example described here, the memory 10 can also receive orientation data which define, for given shot data 14, the orientation of the shot from which these data were obtained. The scene data 12 form a scene model describing a real scene in which localisation is sought. These scene data are, in this case, constructed in advance using a scene construction device carrying out a scene construction procedure, as will be described hereinbelow. These scene data are preloaded into the memory 10 of the localisation device 1 in an initialisation step. The shot data 14 comprise a shot, in this case in the form of a two-dimensional image taken from a given viewpoint.

The localisation device 1 uses these scene data 12 and these shot data 14 to determine a pose, i.e. the pair formed by the orientation and position of the viewpoint from which the shot data 14 were acquired. In a case where the pose of this viewpoint is directly related to the pose of the localisation device, the pose of the device can thus be determined from a single shot and the scene data. The pose in this real scene is three-dimensional, and is expressed in an orthogonal frame of reference, referred to herein as the common frame of reference R0. In the example described here, a pose thus comprises two three-dimensional vectors, the first vector being a position vector and the second vector being an orientation vector.

The scene data 12 comprise a list of three-dimensional object pairs, each three-dimensional object pair comprising data for modeling an object in this scene in three dimensions. In the example described here, each three-dimensional object pair comprises an object identifier and ellipsoid data.

The object identifier of the three-dimensional object pair designates an object present in the scene. In one embodiment, the object identifier is an identifier of an object class corresponding to a type of object present in the scene. The use of object classes makes it possible to associate the same object identifier with a plurality of object pairs, in the case where the same type of object is present several times in the scene. Alternatively, this object identifier can be a unique identifier associated with a unique object present in the scene.

Ellipsoid data define an ellipsoid, i.e. the shape, orientation and position of an ellipsoid in the common frame of reference. This ellipsoid is an approximation of the general shape of the object of the three-dimensional object pair determined during the scene construction procedure.

In the example described here, these ellipsoid data comprise a 3×3 real symmetric positive definite ellipsoid matrix E and a position P of the centre of the ellipsoid, both expressed in the common frame of reference R0. Due to its shape, the matrix E is diagonalisable and has a proper frame of reference RE in which it is diagonal with three positive coefficients AE, BE and CE. The coefficients AE, BE and CE define the three semi-axes of the ellipsoid. The proper frame of reference RE of the ellipsoid defines an orientation of the ellipsoid in the common frame of reference R0.

The scene data has been described here as comprising one three-dimensional object pair per object present in the scene, including the case where a plurality of objects of the same type and same dimensions are present in a scene. Alternatively, the object identifier and the ellipsoid data can be combined for objects of the same type, and the respective positions of two objects within the scene can be considered to be a differentiating element. This can take place when an object class covers objects of the same type, of the same dimensions and whose respective ellipsoids are oriented in substantially the same way.

The shot data 14 are related to a shot in the scene in which localisation is sought, from a given viewpoint that is to be determined using the localisation device 1. The shot data 14 comprise a two-dimensional image, also referred to as a shot. In the embodiment described here, this two-dimensional image is of the bitmap type. The two-dimensional image can be stored in the memory in the form of a lossy compressed, lossless compressed, or uncompressed file, and in BMP, GIF, TIFF, PNG, JPEG, PPM, or any other format suitable for encoding bitmap images, including RAW-type formats from a shot device of the video or stills camera type. The two-dimensional image in this case is in colour. Alternatively, the two-dimensional image could be in black and white.

As with any positioning problem, the intrinsic parameters of the camera must be known either through a conventional calibration process or by using the parameters available in the EXIF (exchangeable image file format) field of the images. These parameters are used to deduce the line of sight corresponding to a pixel in the camera frame of reference and are integrated into the shot data 14.

The detector 20 receives the shot data 14 stored in the memory 10, in particular a shot. The detector 20 recognises, in the shot, one or more objects present therein. This identification of objects takes place via a neural network, in particular a convolutional neural network (CNN). The convolutional neural network is trained to identify objects present in the shot from a list of possible objects. Each object in this list of possible objects corresponds to one of the object identifiers in the scene data 12. Alternatively, the detector 20 could be interactive. For example, the user could outline an object of interest, and then the detector 20 would proceed on the basis of this outline and/or additional interactions. This outline could be in the form of an ellipse, a rectangle, a tuber shape or another shape that delimits an enclosed region.

During the identification of the objects present in the shot, the detector 20 further delimits a shot region in the shot, which substantially corresponds to the region of the two-dimensional image in which the object is located. This shot region can be a rectangular box, a list of pixels, a tuber shape or any other shape that delimits an enclosed region of the two-dimensional image. One example of a CNN adapted to fulfil the role of the detector is described in the article by J. Redmon, S. K. Divvala, R. B. Girshick, and A. Farhadi: "You only look once: Unified, real-time object detection", in CVPR, 2016.

The detector 20 associates the delimited shot region with each identified object, and returns a two-dimensional object pair 22 comprising the object identifier and the shot region.

The preparer 30 receives the two-dimensional object pairs 22 returned by the detector. For each two-dimensional object pair 22 received, the preparer 30 determines, as a function of the shot region, ellipse data defining an ellipse approximating the shot region of the two-dimensional object pair 22 and a position p localising this ellipse in the shot.

In the example described here, these ellipse data are in the form of a 2×2 real symmetric positive definite ellipse matrix e expressed in the frame of reference of the shot R1 and a two-dimensional vector p as the position of the ellipse in the two-dimensional image. Due to its shape, the matrix e is diagonalisable and has a proper frame of reference Re in which it is diagonal with two strictly positive coefficients ae and be. The coefficients ae and be define the two semi-axes of the ellipse. The proper frame of reference Re of the ellipse defines an orientation of the ellipse in the shot frame of reference R1. The determination of this ellipse matrix e can take place by means of a least squares approximation of the shot region.

Alternatively, for example when the shot region is a rectangular box, the ellipse data can be derived from the ellipse inscribed in the rectangular box forming the shot region.

The preparer 30 generates a set of positioning elements for each two-dimensional object pair 22 received. This set of positioning elements includes as many elements as there are three-dimensional object pairs in the scene data 12, the object identifier whereof is the object identifier of the two-dimensional object pair 22. Each positioning element associates the corresponding three-dimensional object pair in the scene data 12 with previously determined ellipse data.

The ellipsoid data and the ellipse data of a positioning element form an ellipse-ellipsoid correspondence. The ellipse-ellipsoid correspondence is essential for determining a shot pose.

At the output, the preparer 30 returns the sets of positioning elements 32, some of which elements can be erroneous due to errors by the detector 20 or due to the presence of possible repetitions of the same object in the scene.

Each correct element allows the pose to be uniquely calculated if the orientation is known as well as a parametric trajectory of the possible solutions if the orientation is unknown. If the orientation is unknown, the pose can be calculated by the intersection of sets using at least two elements.

The combiner 40 receives the sets of positioning elements 32 returned by the preparer 30. The combiner 40 generates a list of candidates 42 from these sets of positioning elements 32. Each candidate 42 associates:
one or more positioning elements and an orientation in the common frame of reference, or
at least two positioning elements that are not derived from the same two-dimensional pair 22.

The Applicant used the fact that the conical projection of an ellipsoid onto a plane always delimited an elliptical region of the plane. Thus, for a scene model included in the scene data 12 that comprises objects approximated by ellipsoids, a shot from a viewpoint (i.e. a conical projection of the scene onto a plane defining a two-dimensional image) is a two-dimensional image comprising a plurality of ellipses, each ellipse corresponding to an ellipsoid visible in the shot.

The Applicant has observed that it is possible to unambiguously determine the position and the orientation of the viewpoint of a shot if two ellipse-ellipsoid correspondences are known. The Applicant has also observed that a single ellipse-ellipsoid correspondence results in one or more continuous sets of poses that can correspond to a viewpoint. Thus, a single ellipse-ellipsoid correspondence is insufficient to determine a pose unequivocally. However, if the orientation of the pose is known, it is possible to unequivocally determine the position associated therewith, and thus the pose.

As described hereinabove, the orientation data defining the orientation of the pose are received in the memory 10 as input data. These data can, for example, be received from an orientation sensor comprised in the device 1, or to which it is connected.

Alternatively, these data could be determined from vanishing points detected within the two-dimensional image of the scene associated with the scene data. In a first example, the method used to determine the shot orientation in the common frame of reference of the scene is a statistical analysis method taken from the article by G. Simon, A. Fond, and M.-O. Berger. "A-Contrario Horizon-First Vanishing Point Detection Using Second-Order Grouping Laws". In ECCV, 2018.

Other examples of orientation determination are described in the articles:
G. Simon, A. Fond, and M.-O. Berger "A Simple and Effective Method to Detect Orthogonal Vanishing Points in Uncalibrated Images of Man-Made Environments.". In Eurographics, 2016.
M. Zhai, S. Workman, and N. Jacobs. "Detecting vanishing points using global image context in a non-Manhattan world". In CVPR, 2016. This method in particular requires the use of a convolutional neural network, and is dependent on the training data.

It should be noted that, in some scenes, vanishing points cannot be detected in order to determine a shot orientation.

Finally, some scenes contain enough objects that it is almost always possible to detect at least two in the shot. For these scenes, it is thus substantially always possible to determine two ellipse-ellipsoid correspondences.

The estimator 50 receives the candidates 42 generated by the combiner 40. The estimator is configured to calculate, for each candidate 42, a pose 52 in the common frame of reference R0.

In the case where the candidate 42 comprises a single ellipse-ellipsoid correspondence (i.e. one positioning element) and an orientation, the associated viewpoint position can be determined by solving the matrix equation (11) in Annex A. The solution of equation (11) in Annex A is a position of the ellipsoid in the frame of reference R1 of the shot. Knowing the position of the ellipsoid in the common frame of reference R0 of the scene (included in the scene data 12) and having determined the position of the ellipsoid in the frame of reference R1 of the shot, the position of the frame of reference R1 in the frame of reference R0 can thus be determined by simple matrix multiplication.

In the case where the candidate 42 contains a number n greater than or equal to two ellipse-ellipsoid correspondences (i.e. two positioning elements) and in the absence of orientation knowledge, the orientation and the position of the viewpoint can be determined. To do this, the estimator solves n equations where each equation is equation (11) with one of the ellipse-ellipsoid correspondences as input parameters, and where these n equations give n sets of solution poses in the shot frame of reference R0. This solution can be exact or approximate, depending on the amount of noise induced by the identification carried out by the detector 20.

The estimator 50 then determines the pose as being the intersection between these n sets of solution poses expressed in the frame of reference R0. For example, in order to calculate this intersection, when a candidate contains three or more ellipse-ellipsoid correspondences, the estimator 50 firstly calculates the orientation of the pose to be calculated as being the orientation that minimises a cost function. To calculate this orientation of the pose to be calculated, the estimator uses a minimisation algorithm and an initial orientation. The initial orientation can be obtained, for example, by analysing vanishing points as seen hereinabove, or by a sensor. Alternatively, the initial orientation can be arbitrarily selected a priori. In the example described here, the minimisation algorithm is a Levenberg-Marquardt algorithm and the cost function is defined by equation (13) in Annex A.

The orientation thus calculated by minimisation is the orientation of the pose to be calculated. The estimator 50 calculates, for each ellipse-ellipsoid correspondence, a respective position based on the calculation described hereinabove and the orientation of the pose just calculated. The estimator 50 then calculates the position of the pose to be calculated by taking a weighted average of the respective calculated positions. The weighting can be carried out by an arbitrary criterion, in a uniform or random manner.

Thus, for each candidate 42 generated by the combiner 40, the calculator 50 calculates a corresponding pose 52.

In the case where the detector 20 detects only one object in the two-dimensional image of the shot data 14, orientation determination is carried out by the combiner 40, as described hereinabove. With the object detected in the two-dimensional image and the orientation, the calculator 50 determines a single pose that corresponds to the location for the shot data.

In the case where the detector 20 detects at least two objects in the two-dimensional image, a plurality of candidates 42 are generated by the combiner 40, and a plurality of corresponding poses 52 are calculated by the calculator 50. The best pose to be returned as a location for the shot data must then be determined.

The selector 60 will then determine which of these calculated poses 52 is the most likely. To do this, for each pose 52, the selector 60 projects all of the ellipsoid data of the scene data onto the shot data from this pose 52. This projection results in a plurality of projected ellipse data. The selector 60 then determines a measurement of similarity between each projected ellipse datum and each ellipse datum defined by a two-dimensional object pair from the detector 20. The selector 60 then determines a likelihood value of the pose 52 using the similarity between projected ellipsoids and detected ellipses.

In the embodiment described here, this measurement of similarity is a score designated by the acronym IoU ("intersection over union"), also known as Jaccard's index. Alternatively, other measurements of similarity can be used: overlap measurement (for example the Dice index) or distances between sets (for example the Hausdorff distance).

The estimator 60 returns the pose 52 with the highest likelihood value as the location 62 for the shot data 14.

In the example described here, the likelihood value for a given pose is the number of intersection values exceeding a given threshold. In this case, this threshold is set at 0.5 for an IoU score. When two or more poses have the same number of values exceeding the given threshold, the sum of the intersection values of each pose is selected to determine the most likely pose.

An example has been described hereinabove, wherein the two-dimensional image is a bitmap and colour image. Alternatively, the image can be a vector image, and the convolutional neural network selected is adapted to suit vector images. Also alternatively, the image can be monochromatic, and again the convolutional neural network selected must be adapted accordingly.

With respect to the preparer 30, the determination of all of the positioning elements that can correspond, as regards the object identifier, to a given two-dimensional pair has also been described. Alternatively, only some of these possible positioning elements can be determined. For example, a number N of selected positioning elements can be determined, which number is smaller than the number of possible positioning elements. These N positioning elements can be selected randomly, or according to a specific criterion contained in the scene data 12 and/or determined from the shot data, for example as a function of heuristics or a priori knowledge of the scene. This advantageously limits the increase in the number of positioning elements to be determined when the scene to be analysed contains many elements. The complexity of the localisation can thus be limited.

The device has been seen to process three-dimensional data in the form of three-dimensional matrices and vectors. Alternatively, other representations can be used, for example with quaternions (4-element rotations), or any other mathematical formalism suitable for describing three-dimensional data. Quaternions constitute a representation that is particularly suited for describing an orientation, such as the orientation of the shot frame of reference R1.

Annex A

The formulae hereinbelow explain how a pose can be determined from the positioning elements.

Equation of an ellipsoid A of centre c. A is a 3×3 real symmetric positive definite matrix:

$$(x-c)^T A(x-c)=1 \qquad (1)$$

Equation of the cone B of centre E. B is an invertible real symmetric matrix of signature (1,2):

$$(x-e)^T B(x-e)=0 \qquad (2)$$

Equation of the matrix B of the projection cone of vertex e (origin of the shot frame of reference) tangent to an ellipsoid of matrix A and centre c, where d=e−c:

$$B = Add^T A - (d^T Ad - 1)A \qquad (3)$$

Equation of the matrix B' of the back-projection cone of vertex e tangent to an ellipse of centre k, proper frame of reference (u,v) and semi-axes a, b:

$$B' = P^T MP - Q \qquad (4)$$

Where I is the identity matrix and P, M and Q satisfy:

$$M = uu^T/a^2 + vv^T/b^2 \qquad (5)$$

$$w = n/(n \cdot (k-e)) \qquad (6)$$

$$P = I - (k-e)w^T \qquad (7)$$

$$Q = ww^T \qquad (8)$$

Where n is a vector of norm 1 such that (u, v, n) is an orthonormal basis of the space, a and b are semi-axes associated with u and v (respectively), k is the centre of the ellipse Ellipse-ellipsoid correspondence equation: two cones B, B' are equal if and only if (9), where s is a non-zero real number:

$$B = s \cdot B' \qquad (9)$$

Knowing an ellipsoid and an ellipse (proper frame of reference, diagonal matrix and centre), the respective projection and back-projection cones thereof can be constructed.

If the cones are equal (i.e. they satisfy formula (9)), then the following formula is satisfied:

$$Ad = sB'd \quad (10)$$

Calculating the pose of the ellipsoid is equivalent to determining the solution triplet (R, d, s) of the equation (X):

$$DRdd^TR^TD - (d^TR^TDRd - 1)D = sRB'R^T \quad (11)$$

Where
R is the orientation of the ellipsoid, i.e. the matrix of passage from the shot frame of reference R1 to the proper frame of reference of the ellipsoid, d is its position and s is a scalar
D is the diagonal matrix of the ellipsoid, such that $A = R^TDR$, and
s is an arbitrary scalar (or real number)
Example of a cost function to be minimised for a given ellipse-ellipsoid correspondence i:

$$F^{(i)}(R) = |\text{discriminant}(P\{A^{(i)}_1(R), B^{(i)}_1'\})|^2 \quad (12)$$

Where
R is the orientation of the camera frame of reference in the common frame of reference,
$A^{(i)}_1$ is the matrix of the ellipsoid i in the frame of reference R1,
$B^{(i)}_1{}'$ is the matrix of the back-projection cone derived from the ellipse i in the frame of reference R1,
P{A,B'} is the polynomial det(A−xB'),
|·| is the absolute value function,
for the ellipse-ellipsoid correspondence in question.
Overall cost function for a set of N given ellipse/ellipsoid correspondences:

$$F(R) = \Sigma_{i=1\ldots N}(F^{(i)}(R)) \quad (13)$$

The invention claimed is:

1. Shot-processing device, comprising:
a memory arranged to receive, on the one hand, scene data that comprise three-dimensional object pairs each associating an object identifier, and ellipsoid data which define an ellipsoid and its orientation and a position of its center in a common frame of reference and, on the other hand, shot data defining a two-dimensional image of the scene associated with the scene data, from a viewpoint corresponding to a desired pose,
a detector arranged to receive shot data and to return one or more two-dimensional object pairs each comprising an object identifier present in the scene data, and a shot region associated with this object identifier,
a preparer arranged to determine, for at least some of the two-dimensional object pairs from the detector, a set of positioning elements, the number whereof is less than or equal to the number of three-dimensional object pairs in the scene data that comprise the object identifier of the two-dimensional object pair in question, each positioning element associating the object identifier and the ellipsoid data of a three-dimensional object pair comprising this object identifier, and ellipse data which define an ellipse approximating the shot region of the two-dimensional object pair in question and its orientation as well as a position of its center in the two-dimensional image,
a combiner arranged to generate a list of candidates each associating one or more positioning elements and a shot orientation, and/or the combination of at least two positioning elements, the positioning elements of a candidate being taken from separate two-dimensional object pairs and not relating to the same three-dimensional object pair,
an estimator arranged to calculate, for at least one of the candidates, a pose comprising a position and an orientation in the common frame of reference from the ellipse data and the ellipsoid data of the positioning elements, or from the ellipse data and the ellipsoid data of the one or more positioning elements and the shot orientation,
a selector arranged, for at least some of the poses, to project all of the ellipsoid data of the scene data onto the shot data from the pose, to determine a measurement of similarity between each projection of the ellipsoid data and each ellipse defined by a two-dimensional object pair coming from the detector, and to calculate a likelihood value by using, for each projection of the ellipsoid data, the largest measurement of similarity determined, and to select the pose that has the highest likelihood value.

2. Shot-processing device according to claim 1, wherein the selector is arranged to carry out a measurement of likelihood based, for a given pose, on the number of measurements of similarity that exceed a given threshold.

3. Shot-processing device according to claim 1, wherein the preparer determines the ellipse data of each positioning element using a method of least squares.

4. Shot-processing device according to claim 1, wherein the detector determines a rectangular box as a shot region of each two-dimensional pair to be returned, and
the preparer determines the ellipse data of each positioning element based on the ellipse inscribed in the rectangular box forming the shot region.

5. Shot-processing device according to claim 1, wherein the combiner is arranged to determine the shot orientation as a function of the detection of vanishing points within the two-dimensional image of the scene associated with the scene data.

6. Shot-processing device according to claim 1, wherein the combiner is arranged to determine the shot orientation by means of a sensor.

7. Shot-processing device according to claim 1, further comprising a shot device arranged to capture a shot of the scene from a given viewpoint in order to derive the shot data therefrom.

8. Shot-processing method based on:
scene data that comprise three-dimensional object pairs each associating an object identifier, and ellipsoid data which define an ellipsoid and its orientation and a position of its center in a common frame of reference, and
shot data defining a two-dimensional image of the scene associated with the scene data, from a viewpoint corresponding to a desired pose,
the method comprising the following operations:
a) detecting, from shot data, one or more two-dimensional object pairs each comprising an object identifier present in the scene data, and a shot region associated with this object identifier,
b) determining, for at least one of the two-dimensional object pairs detected, a set of positioning elements, the number whereof is less than or equal to the number of three-dimensional object pairs in the scene data that comprise the object identifier of the two-dimensional object pair in question, each positioning element associating the object identifier and the ellipsoid data of a three-dimensional object pair comprising this object identifier, and ellipse data which define an ellipse approximating the shot region of the two-dimensional object pair in question and its orientation as well as a position of its center in the two-dimensional image, c) generating a list of candidates each associating one or more positioning elements and a shot orientation, and/or the combination of at least two positioning elements, the positioning elements of a candidate being taken from two separate two-dimensional object pairs and not relating to the same three-dimensional object pair, d) calculating, for at least one of the candidates, a pose comprising a position and an orientation in the common frame of reference from the ellipse data and the ellipsoid data of the positioning elements, or from the ellipse data and the ellipsoid data of the one or more positioning elements and the shot orientation, e) projecting, for at least some of the poses, all of the ellipsoid data of the scene data onto the shot data from the pose, to determine a measurement of similarity between each projection of the ellipsoid data and each ellipse defined by a two-dimensional object pair detected, and to calculate a likelihood value by using, for each projection of the ellipsoid data, the largest measurement of similarity determined, and f) selecting the pose that has the highest likelihood value.

* * * * *